Feb. 15, 1944.  G. A. TINNERMAN  2,341,829
FASTENING MEANS
Filed Dec. 3, 1941  2 Sheets-Sheet 1
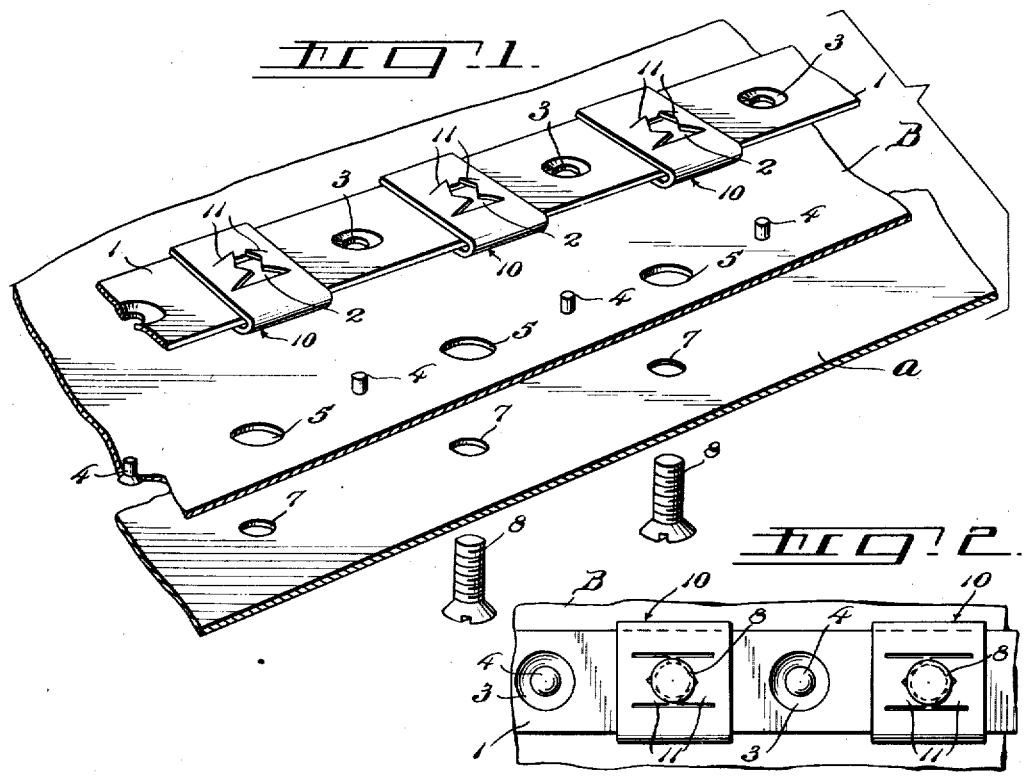
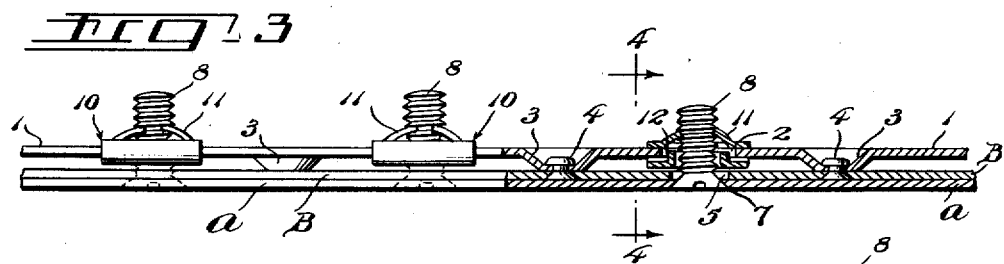
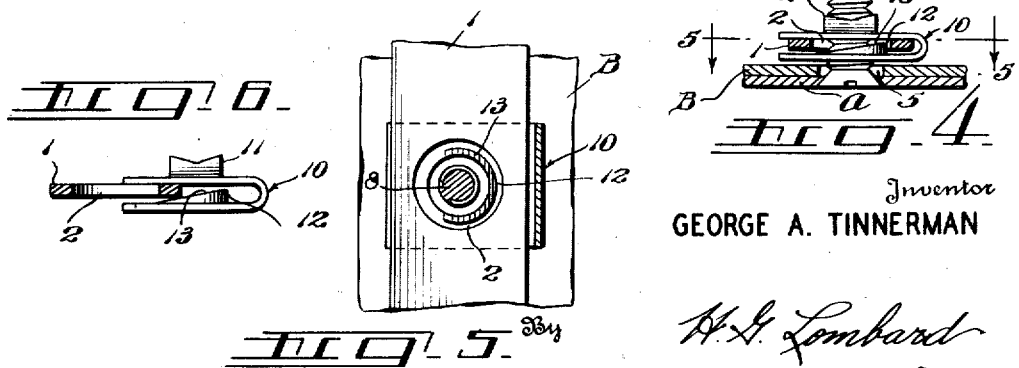
Inventor
GEORGE A. TINNERMAN
By H. G. Lombard
Attorney

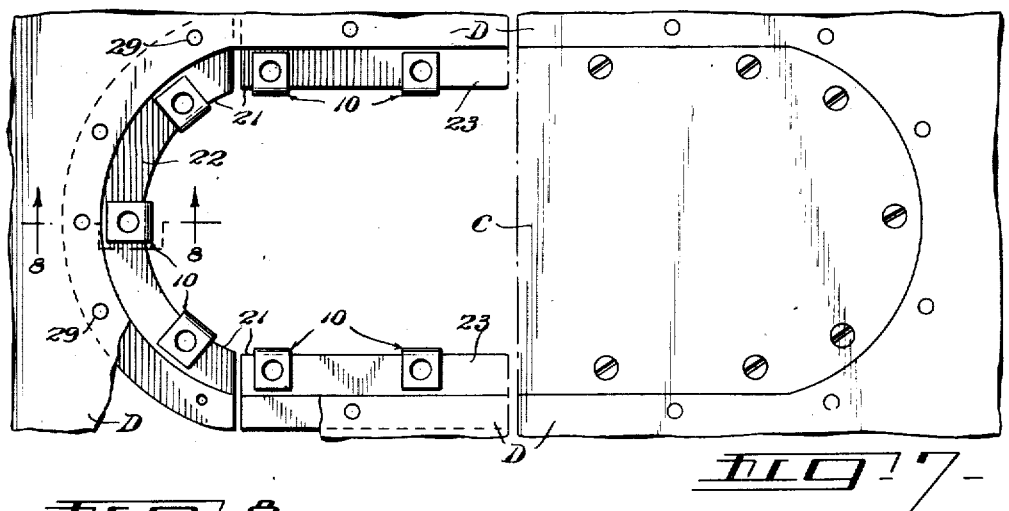
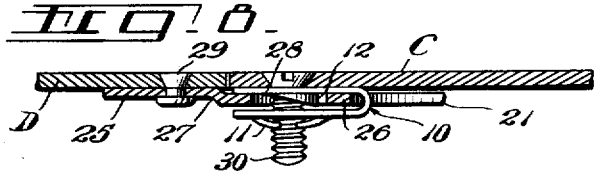
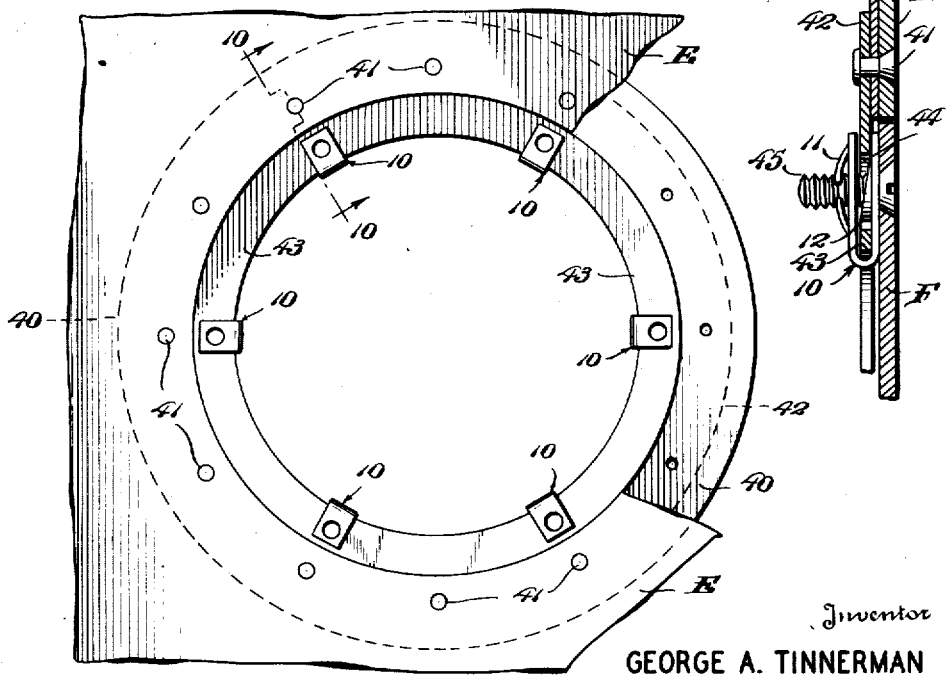
Inventor
GEORGE A. TINNERMAN

Patented Feb. 15, 1944

2,341,829

UNITED STATES PATENT OFFICE 2,341,829

FASTENING MEANS

George A. Tinnerman, Cleveland, Ohio, assignor to Tinnerman Products, Inc., Cleveland, Ohio, a corporation of Ohio Application December 3, 1941, Serial No. 421,500

7 Claims. (Cl. 85—32)

This invention relates in general to fastening means and is directed, more particularly, to improvements in nut secured installations embodying a plurality of individual nut devices which are held in an assembly by a retainer strip, or the like, in predetermined spaced relation for receiving cooperating bolt or screw fastenings in securing removable plates, panels and similar parts or, otherwise, joining relatively large structural members over an elongated area in a strong, durable and relatively inexpensive construction.

The invention has particular application in what are known as blind fastening locations wherein the rearward side of a supporting part is not conveniently or readily accessible and it is necessary for the nut devices to be attached in position on such supporting part prior to the operation by which the cooperating bolts or screws are applied to secure an associated part thereto in a completed installation. Such blind fastening means frequently are necessary in the fabrication of sheet metal structures where, for example, it is desired to secure a removable plate along its edges over a service opening in a supporting part, or where the longitudinal edges of superposed or juxtaposed structural parts are to be united either in removably or permanently secured relation as along a seam or similar joint, and further, in many fastening installations wherein its is necessary or desirable to provide a mounting or attachment of an object by bolts or screws applied from the accessible side only of an assembly without requiring access to the opposite side thereof for holding the cooperating nuts during insertion and tightening of the bolts or screws therewith.

In the securing of lightweight parts, as in aircraft, for example, it often is found impractical and impossible to provide integral thread openings in a lightweight sheet metal supporting part which are capable of retaining the cooperating bolts or screws with the required strength and durability and accordingly, in such instances, it has been the practice to employ ordinary threaded nuts or elastic lock nuts individually secured to the supporting part or attached in multiple in the manner of gang nuts in a channel-shaped holder. Such arrangements necessarily are costly and have been found so expensive as to make the use thereof prohibitive in many cases, while the same otherwise are objectionable in involving an entirely inordinate amount of weight which, of course, is a matter of paramount importance in aircraft and related structures.

A primary object of the invention, therefore, contemplates the provision of a fastening means of the character described which is strong and durable and lends itself to economical quantity production while otherwise involving considerably reduced costs of manufacture and from eighty to ninety percent less weight than heretofore known arrangements embodying threaded nuts, or the like. These advantages, in accordance with the invention, reside in the improved construction wherein a simple inexpensive nut holding means is provided by a single thickness strip of metal or similar material together with nut devices provided with means for easily and quickly attaching the same to the retaining strip in predetermined spaced relation and capable of limited adjusting movement in attached position.

Preferably the nut devices are of an inexpensive sheet metal construction comprising integral thread engaging means and combined attaching and locking means for attachment to the retaining strip against removal and relative rotary movement during insertion and tightening of the bolts or screws therewith, while otherwise being advantageously light in weight and capable of providing a self-locking threaded engagement with a cooperating bolt or screw to secure the parts of the assembly under continuously effective spring force in a manner to withstand accidental loosening against extreme conditions of shock, vibratory motion, and the like.

The invention contemplates, further, an arrangement for attaching a plurality of nut devices in fastening position in an assembly by means of a highly simplified retaining strip construction designed to hold the nut devices against accidental removal but capable of limited lateral adjusting movement over bolt passages in the supporting part such that the cooperating bolts or screws may be threadedly engaged therewith in any position necessary to compensate for manufacturing variations or irregularities in the parts of the assembly.

With the various objects and advantages apparent from the foregoing in view, further objects and advantages in the construction, arrangement and general combination of parts of the invention will be appreciated as the description proceeds with reference to the accompanying drawings, for purposes of illustration, but not of limitation, in which like reference characters designate like parts throughout, and in which:

Fig. 1 is a fragmentary perspective view showing in exploded relation the several parts of an assembly in accordance with one embodiment of the invention;

Fig. 2 is a fragmentary plan view showing the retainer strip and nut devices held thereby in position for receiving cooperating bolts or screws in the final fastening of the parts of the assembly;

Fig. 3 is a sectional view, partly in elevation, showing the final fastening of the parts of the assembly represented in Fig. 1;

Fig. 4 is a sectional view taken on line 4—4 of Fig. 3, looking in the direction of the arrows;

Fig. 5 is a sectional view on line 5—5 of Fig. 4, looking in the direction of the arrows; and, Fig. 6 is a sectional view illustrating the initial application of a U-shaped nut device to attached relation on the retainer strip.

Fig. 7 is an elevational view of a further embodiment of the invention with parts broken away to show the securing arrangement of the retaining strip in this form of the invention; and, Fig. 8 is a sectional view taken on line 8—8 of Fig. 7 looking in the direction of the arrows and including a flange portion of the member secured to the supporting part.

Fig. 9 is an elevational view showing the relation of the several parts of an assembly in another embodiment of the invention; and, Fig. 10 is a sectional view, as along line 10—10 of Fig. 9, and including a fragmentary showing of the member secured to the supporting part.

In many sheet metal constructions, particularly aircraft and other structures requiring a smooth, exterior surface for streamlining purposes, it is necessary for the parts of an assembly to be secured by bolt or screw fastenings in a manner to be readily detachable while otherwise defining a smooth exterior surface in the areas engaged by the heads of the bolts or screws. In this respect, the present invention has particular application in assemblies for detachably locking in place panel-like members such as cover plates, closure panels and similar parts which cover or conceal inspection or service openings in the body of an aeroplane or motor vehicle, as, for example, in a cowling assembly or the mounting of a radiator casing, hood, or the like.

In various fastening assemblies, particularly those known as blind locations, wherein it is inconvenient or impossible for an operator to hold a nut as the cooperating bolt or screw is applied thereto, it is necessary or desirable for the nut device to be permanently attached to its associated part and thus in position to receive readily the cooperating bolt or screw either in the initial fastening of an assembly or when the parts are disassociated and resecured. This is true, particularly, where nuts or nut devices in multiple are required, and, otherwise, in quantity production of an assembly, where it is found frequently that the bolt passages in the respective parts to be secured cannot always be provided with such exactness as always to align properly in the final securing of said parts. Accordingly, to overcome this objection, it is the usual practice to provide the bolt passages in the supporting part of sufficiently large size to receive the bolts or screws in any necessary position of application, with the nuts retained on said supporting part in a loose, floating attachment whereby each nut may be shifted or adjusted as required to threadedly engage the associated bolt or screw properly in securing the parts of the assembly in the most effective manner.

Referring now, more particularly, to the drawings, Figs. 1-6, inclusive, show one form of the improved fastening means of the invention as provided for securing two or more complementarily fitted, superposed or juxtaposed parts A, B, in an installation. Such parts may be of any suitable material with the secured portions thereof usually assuming the form of complemental plates of which part B may be termed the supporting plate to which a retainer is secured to attach a plurality of nuts or nut devices 10 at the rearward side of the assembly. For purposes of illustration, said parts A, B, are referred to as sheet metal panel members, and in an aircraft construction, for example, said panels preferably are constructed of aluminum with the supporting panel B representing a portion of an aeroplane body adjacent an inspection or service opening therein, and part A being a portion of the cover plate or fairing secured thereto to cover such service opening but capable of being easily removed, if desired, to permit access to such opening for any desired purpose. In a further respect, it will be understood that part B may be a portion of any framework which is provided with the required number of nut devices in spaced relation to receive a corresponding number of bolt fastenings for securing thereto the body panel or other structural member or object represented by part A.

In the present example, a plurality of sheet metal nuts in predetermined spaced relation are provided, each in an adjustable, floating attachment over correspondingly spaced bolt passages in part B by means of a retainer, designated generally 1, comprising a simple, inexpensive strip of any suitable material, preferably sheet metal. In aircraft assemblies, aluminum strips are the most desirable, mainly for lightness in weight, but otherwise, any other sheet metal material may be employed with equal effectiveness. The retainer in strip form may be provided in any desired shape, of course, to conform to any particular contour or path along which the bolts or screws are to be applied to the nuts in fastened position. The retainer strip, otherwise, is of any desired length and of a width and thickness selected according to service requirements and the predetermined size of the parts secured.

In a preferred construction, the retainer strip is provided along its length with a series of openings forming alternately disposed nut retaining openings 2, Fig. 3, and apertured depressions or bosses 3 projecting downwardly out of the plane of the retainer strip. By this construction each nut device 10 is disposed intermediate spaced points of attachment of the retainer strip to the supporting part B to provide for a uniformly secured fastening arrangement and maximum strength and durability in the areas fastened. Of course, said openings may be provided in any other desired relation, as with the attaching holes or apertures in depressions or bosses 3 offset laterally of the nut retaining openings 2, or provided along the sides or at the ends of a retainer strip otherwise formed with the nut retaining openings in suitable spaced relation to the bolt passages in the supporting part.

In the present example, the apertured depressions or bosses 3 provide for receiving welding or seating attaching rivets 4 to secure the retainer strip to the rearward side of supporting part B with the spaced nut retaining openings 2 therein overlying the correspondingly spaced bolt passages 5 in said part B, which preferably, are enlarged as necessary to permit application of a securing bolt or screw therethrough in any necessary position of adjustment. The arrangement otherwise is such that the depressions or bosses 3 maintain the intermediate body portions of the retainer in spaced relation to the adjacent rearward surface of part B while said rivets 4 preferably are made flush with the forward side thereof in order to permit the associated part A to be brought into close uniform abutting engagement therewith in the final fastening of the assembly. In the part A to be secured to said supporting part B, the bolt passages 7, need be only slightly larger than necessary to receive the shanks of bolts or screws 8 having tapered, generally conical heads adapted to lie flush therewith in providing the desired smooth exterior surface for streamlining purposes.

Adjustably attached to part B by the retainer are sheet metal nuts, designated generally 10, in the form of generally U-shaped devices comprising a pair of arms adapted to embrace the body of the retainer in interconnected relation therewith. Such sheet metal nuts are a relatively cheap article of manufacture in that they may be produced by a simple stamping and forming operation from comparatively small, inexpensive sections of any suitable sheet metal, preferably of a spring metal nature, such as spring steel or cold rolled metal having spring-like characteristics. While the generally U-shaped construction of the sheet metal nuts may be provided of sheet metal sections of various outlines, from the standpoint of most economical quantity production, the same are most advantageously formed from generally rectangular blanks obtained from ordinary sheet metal strip stock with a minimum loss or waste of material.

In a preferred construction of said generally U-shaped sheet metal nuts 10, the upper arm is provided with integral bolt or screw engaging means in the form of cooperating tongues 11, or the like, which are pressed, stamped, extruded or otherwise struck and formed from the sheet metal section to project out of the plane thereof and define a thread opening for threadedly engaging the bolt or screw in the manner of a nut. The lower or attaching arm of the sheet metal nut is provided with a bolt opening in line with said thread opening and a locking detent 12, preferably in the form of a raised protuberance defined by a drawn collar or hub bordering said bolt opening. Said detent 12 serves as a substantial indexing or positioning means to maintain the sheet metal nut in loosely attached relation with the retainer by being received in the nut retaining opening 2 therein from the inner side of said retainer to cooperate with the arm carrying the bolt or screw-engaging means 11 on the outer side thereof. It will be understood that the body of the retainer surrounding the opening 2 is spaced from the adjacent part B in a manner whereby the arms of the sheet metal nut may be applied readily to embrace the retainer with said detent 12 on the lower arm passable below the retainer body to be snapped into said opening 2 therein with sufficient clearance to provide the desired adjustable or floating arrangement of the thread engaging means 11 over the associated bolt passage 8 in said part B. To this end, the lower or attaching arm of the sheet metal nut may be reduced in width to provide for any required lateral shifting of the sheet metal nut between adjacent depressions 3 of the retainer so that the thread opening defined by the tongues 11 on the upper arm may be disposed in any necessary location for threadedly engaging the bolt or screw 8, thereby allowing the parts A, B, to be exactly and precisely fitted in properly assembled relation before the bolt or screw 8 is applied to secure these parts in the final fastening thereof.

The locking detent 12 of the sheet metal nut which is received in the nut retaining opening of the retainer may be provided in various ways and on either arm of the nut device; in the preferred construction illustrated, the same is formed on the lower or attaching arm from a marginal edge portion adjacent the bolt opening in said arm. Preferably said detent 12 has its upper edge tapered generally downwardly and outwardly toward the free end of the arm on which it is provided to define an inclined cam surface 13 facilitating application of the U-shaped nut device to attached relation over an edge portion of the retainer as shown in Fig. 6.

The invention fully contemplates the provision of other thread engaging means equivalent to the tongues 11 on the upper arm of the generally U-shaped sheet metal device 10 in the manner of a separate threaded nut spot-welded, riveted or otherwise united thereto, but such arrangements are relatively expensive and make the cost of the fasteners prohibitive, in many cases, because of the added step in manufacture which is required in addition to a separate assembling operation and the cost of a lock nut or lock washer for providing the bolt or screw with means preventing loosening or displacement thereof from tightened fastening position.

In the preferred construction shown, the above noted objections are obviated and most advantageously eliminated in the provision of said fasteners 10 in the form of a unitary, inexpensive, one-piece, sheet metal product in which the thread engaging means for the bolt or screw are integrally provided on the upper arm of the device in the manner of simple tongue elements 11, or the like. Referring to Fig. 2, it will be understood, more particularly, that such thread engaging elements 11 are best provided from the sheet metal material of the fastener by an aperture intermediate spaced parallel slits which form the cooperating substantial tongues having spaced extremities defining the desired thread or thread opening corresponding substantially to the root diameter of the bolt or screw for threadedly engaging the thread thereof. Said tongue elements 11 otherwise are preferably formed to project outwardly out of the plane of the arm, and are bent intermediate their lengths in substantial ogee formation to provide for the maximum strength obtainable to withstand the tightening action of the bolt or screw as it is advanced to finally applied fastening position.

Said thread engaging means may be pressed, stamped, extruded or otherwise provided on the fastener in any suitable form or construction so long as the same threadedly engage with the thread of the bolt or screw, and, in this relation, the present invention fully contemplates the provision of such integral thread engaging means in various other similar and related forms, as in the manner of a substantial perforated protuberance which is pressed from the sheet metal and shaped to provide a helical thread or thread opening, or otherwise has the walls thereof tapped to provide a plurality of threads for threadedly engaging the bolt or screw. However, it has been found that such thread engaging means prepared in the form of cooperating, yieldable tongues 11, as shown, are the most efficient and most practical in that they are possessed of unusual inherent strength and will not collapse or pull through when the bolt is tightened, nor loosen under continuous strain and vibration in the installation. This takes place by reason of the fact that the sheet metal material from which such tongues are formed is of less thickness than the pitch or spacing between adjacent thread convolutions of the bolt or screw, wherefore the extremities of said tongues tend, more effectively, to move toward each other and dig into the grooves intermediate adjacent thread convolutions when tightened therewith and otherwise become embedded in the root of the bolt or screw in locked, frictional fastening engagement therewith in applied fastening position. Thus, in the present example, the tongues 11 are shown as extending out of the plane of the upper arm of the fastener in substantial ogee formation and provided, preferably, with diamond-shaped or notched extremities, Fig. 2, forming substantial biting jaws designed to cut into the root of the bolt and adjacent thread surfaces thereon in positive locking relation therewith in the most effective manner. There is thereby eliminated the necessity for a separate, auxiliary locking means such as a lock nut or lock washer and this, in mass production, makes possible a considerable saving not only in the cost of such locking devices, but also, in the expense and labor involved in the tedious, time consuming assembling operations and other added steps in manufacture which such auxiliary locking means require. It is to be understood, however, that the present invention is not limited in any manner or form to the illustrated construction of the thread engaging means but rather, comprehends also, various other similar and related forms of such tongues or equivalent thread elements or thread engaging means.

As illustrated in Fig. 6, the U-shaped nut devices 10, in the instant preferred embodiment, are provided with the arms thereof spaced greater than the thickness of the retainer strip, or, otherwise so spaced at their free ends as to receive easily and quickly the associated body portion of the retainer strip adjacent the nut retaining opening 2 therein on being initially applied. As the nut simultaneously is pushed to the fastening position thereof, the inclined cam surface 13 of the locking detent 12 cams over the adjacent edge of the retainer body 1 to cause a gradual spreading of the resilient arms of the nut device as necessary to permit said detent 12 to clear such edge and snap into the nut retaining opening 2 as shown in Figs. 4 and 5. Said detent 12 preferably defines a semicircular shoulder portion having suitable clearance in the opening 2 to provide the desired loose, floating attachment of the nut on the retainer by being adapted to engage a wall of said opening to lock the nut device in attached position while otherwise leaving a sufficiently large passage for readily receiving the bolt fastener 8 to be applied to the thread engaging means 11 of the nut device for securing the parts A, B, in a completed fastening installation.

In use, it will be understood that the retainer strip, is attached to the supporting part B by rivets 4, or equivalent means, such that the nut retaining openings 2 therein are aligned with the bolt passages 5 in said part B, and either with or without the U-shaped nut devices 10 attached thereto by means of such nut retaining openings 2, as aforesaid. If the retainer strip without the nut devices is secured to said supporting part B, the U-shaped nut devices then may be applied easily and quickly to embrace the same on its opposite faces over the associated nut retaining openings 2 therein inasmuch as the adjacent portions of the retainer body are so spaced from the supporting part B by the depressions 3 as to permit passage of the lower or attaching arm of a nut device as necessary to snap the locking detent 12 thereon into attached relation in the nut retaining opening 2 in the retainer. More usually the retainer strips are prepared in quantities with the nut devices attached thereto, as shown in Fig. 1, prior to securing the same to the preperforated supporting part B by the rivets 4, welding, or other suitable means; and, in this relation, in mass production methods, important savings may be obtained in the cost of the retainer strips by preparing the same in large coils which may be severed as necessary for any number of units required and in different lengths for use in various assemblies in which it is necessary or desirable to employ gang nuts having individual floating mountings in the relation and for the purposes described.

Accordingly, with the part B provided with the adjustably attached nut devices overlying the bolt passages 5 therein, the part A may be fitted thereto in the position necessary to provide an exact precise assembly of these parts with the assurance that any slight misalignment of the registered bolt passages 5, 7, Fig. 1, in the proper assembled relation of said parts A, B, respectively, may be compensated for by shifting the adjustably attached nut devices as required to pass the associated bolts or screws through said registered bolt passages, and through the bolt openings adjacent the detents 12 on the lower arms of the nut devices into proper threaded engagement with the thread engaging means 11 on the upper arms thereof.

Figs. 7 and 8 illustrate a further form of the invention as embodied in a releasable fastening assembly for a hand hole plate or similarly locking a cover plate C over an inspection or service opening in a body part D, for example. It is desirable, in many instances, to have both plates C, D, lie in a common plane in order that the smooth or streamlined contour of the aeroplane or other structure will be unobstructed by any projecting portion of the cover plate C and the fasteners therefor. As shown in Fig. 7, the retainer 21 in strip form may be provided in arcuate portions, 22, as at the ends of the opening, and complementary straight portions 23 along the sides thereof, the same being either in sections, as shown, or defining a continuous strip provided in the manner of a one-piece stamping, for example. Preferably, the retainer strip is of a contour corresponding generally to the outline of the opening and cover plate and is sufficiently wide to comprise an attaching portion 25, Fig. 8, and a laterally disposed, nut holding portion 26 which is offset therefrom as by a deformation 27, and provided with nut retaining openings 28 in a predetermined spaced relation corresponding substantially to the preperforated bolt passages in the cover plate C.

Accordingly, as best seen in Fig. 8, the retainer strip is secured to the supporting part D by means of said attaching portion 25 united thereto by flush-type rivets 29, welding or equivalent means in a manner whereby the nut holding portion 26 extends inwardly in overlapping relation to the peripheral edge of the service opening, or the like, in said part D. The offset relation of said nut holding portion 26 is such as to accommodate the thickness of the arm portion of the sheet metal nut bearing thereagainst as shown in Fig. 8, in a manner whereby the cover plate C may be received in the opening in said part D in flush relation therewith to preserve the substantially smooth, streamlined exterior of the aeroplane body or other structure.

The nut devices 10 may be preassembled on the retainer strip portion 26 or otherwise attached thereto after the same thus is secured to the supporting part D, substantially as described with reference to Figs. 1-6, inclusive, in a manner whereby the arms of the U-shaped nut devices embrace the retainer strip over the associated nut retaining openings 28 therein with the locking detents 12 received in said openings to lock the nut devices in attached position in a loose floating arrangement of the thread engaging means 11 over said openings 28. Thus the laterally disposed nut holding portion 26 of the retainer strip supports the nut devices 10 within the service opening in part D in a manner to receive easily and quickly the cooperating bolts or screws 30 for securing the cover plate C while otherwise defining an abutment against which said cover plate may firmly seat and be rigidly supported in finally secured position either in the initial mounting thereof or on being replaced after removal for repairs or service to the mechanism concealed thereby.

Figs. 9 and 10 show a further embodiment of the invention in a mounting for a hand hole plate or similar member to be removably secured over an opening in a supporting part in an application and use somewhat similar to that just described. The opening in the body or supporting part E, is of generally circular or other configuration for receiving a cover plate F, or similar member of corresponding shape in substantially flush relation to the outer surface thereof. In an aircraft wing structure, for example, said body member would be a relatively light weight part defining the skin surface of the wing and accordingly in order to reinforce and bolster the same around the opening defining the hand hole or a mounting opening for a landing light housing, for example, a doubler plate 40, provided in the manner of a ring stamping of aluminum or other suitable material, is secured to said supporting part by rivets 41 which may also secure the retainer strip 42 in attached position, as shown in Fig. 10, or, said retainer strip attached by separate means to said doubler plate 40 in a more or less equivalent construction. In either event, the retainer strip 42 includes a nut holding portion 43 which extends in overlapping relation to the peripheral edge of the hand hole or other opening in said part E. In this respect, the doubler plate 40 serves as a spacing means providing the offset relation of the nut holding portion 43 of the retainer strip as necessary to accommodate the thickness of the inner attaching arms of the U-shaped sheet metal nuts 10 bearing thereagainst, as shown in Fig. 10, in a manner whereby the associated cover plate or similar member F, may be received in the hand hole in said part E in flush relation therewith to provide for a substantially smooth, streamlined exterior to the part defining the wing surface or other body structure.

Similarly to the embodiment of Figs. 7 and 8, the nut devices 10 may be preassembled on the nut holding portion 43 of the retainer strip prior to securing the same in the installation as aforesaid, or otherwise, attached thereto after the retainer strip is secured to the supporting part E, substantially as described with reference to Figs. 1-6, inclusive, in a manner whereby the arms of the U-shaped nut devices 10 embrace the retainer strip over the associated nut retaining openings 44 therein with the locking detents 12 received in said openings to lock the nut devices in applied fastening position with each having a loose, adjustable floating attachment in such fastening position. Thus, the nut holding portion 43 of the retainer strip supports the nut devices within the marginal edge of the hand hole or other opening in part E in a manner to receive easily and quickly the cooperating bolts or screw 45 which are engaged with the thread means 11 of said nuts for securing the cover plate or similar member, F, while otherwise defining an abutment against which said cover plate may firmly seat and be rigidly supported in finally secured position but capable of being readily removed and resecured with the same degree of effectiveness as often as may be necessary or desirable for inspection, repairs or service purposes.

In any form of the invention, it will be appreciated that an important advantage resides in the fact the fastening arrangement is such that due provision is made for manufacturing variations and irregularities in the parts secured in that the same may be precisely and exactly fitted in properly assembled relation, with the nut devices being adjustable as necessary to compensate for any discrepancy in registering the bolt passages in the respective parts to receive the bolt or screw fastenings and permit the threading thereof with the associated nut portions of the fasteners in the manner necessary to provide a strong and durable fastening installation adapted to withstand accidental loosening against the most severe conditions of shock, vibratory motion and the like, for the purposes intended.

The nut devices 10, preferably are constructed of relatively thin sheet metal, the thickness of which is selected according to service requirements and the predetermined size of the parts secured. The nut devices are most effective when provided of spring metal suitably spring tempered and otherwise treated to give the desired toughness and hardness, particularly in the case of devices which are put to heavy duty in installations where extreme vibratory motion takes place. A cheap but effective fastener may be provided from cold rolled metal, such as cold rolled steel, which is untempered but of a spring metal nature and preferably harder than that of the cooperating bolt or screw employed therewith in providing an efficient and reliable fastening means adapted for a long period of satisfactory service and use.

While the invention has been described in detail with specific examples, such examples are intended as illustrations only, since it will be apparent to those skilled in the art that other modifications in the construction, arrangement and general combination of parts thereof may be devised without departing from the spirit and scope of the invention. The present embodiments are therefore to be considered in all respects as illustrative and not restrictive, the scope of the invention being indicated by the appended claims rather than by the foregoing description, with all changes falling within the scope, meaning and range of equivalency of the claims intended to be embraced therein.

What is claimed is:

1. Fastening means for securing a member to a supporting part by a plurality of bolts or screws in spaced relation, comprising a retainer strip provided with a row of apertured nut-retaining portions, intermediate apertured depressions projecting from one side of the retaining strip for attaching the retainer strip to the supporting part with said apertured nut retaining portions spaced from said supporting part, and nut devices comprising spaced arms receiving said retainer strip therebetween in attached relation over the openings in said nut retaining portions of the retainer strip, one of said arms carrying bolt or screw engaging means, and means for locking the nut devices in place on the strip.

2. A fastening device for attaching a member in a number of locations to a support comprising a comparatively thin and narrow strip having a row of bolt holes through it, depressed hollow bosses on the strip extending to the same side thereof and adapted to engage the support while leaving substantially flat regions between the bosses spaced from the support, and a set of thread-engaging elements, each having a snap fastening engagement with the strip and each comprising a strip of sheet metal doubled on itself to provide two arms adapted to lie on opposite sides of the strip respectively, each arm having an opening for the passage of a bolt, one of the arms being deformed about the opening therein to provide thread-engaging means, one of the arms having a projection adapted to occupy the opening in the strip, said projection having a face inclining toward the latter arm to enable the clip to slide readily across the strip and obtain a ratchet locking action therewith.

3. A fastening device comprising a strip having an offset marginal portion adapted for attachment to the support while leaving the marginal portion at the other edge free and back from the plane of the support, and a set of thread-engaging elements, each having a snap-fastening engagement with the unattached marginal portion of the strip and each comprising a strip of sheet metal doubled on itself to provide two arms adapted to lie on opposite sides of the strip respectively, each arm having an opening for the passage of a bolt, one of the arms being deformed about the opening therein to provide thread-engaging means, one of the arms having a projection adapted to occupy the opening in the strip, said projection having a face inclining toward the latter arm to enable the clip to slide readily across the strip and obtain a ratchet locking action therewith.

4. Fastening means for securing a member to a supporting part by a plurality of bolts, screws or other stud fasteners in spaced relation, comprising a retainer strip to be attached to said supporting part and overlie it and having portions on opposite faces of the strip spaced from said part by intermediate bosses and provided with openings for receiving said stud fasteners, and stud securing means attached to said retainer strip in the regions of said openings therein and each comprising a sheet metal device folded on itself and having spaced arms receiving said retainer strip therebetween by snap action, one of said arms carrying means for engaging a stud fastener passed through the associated opening in said retainer strip, and one of said arms including means occupying said associated opening of the retainer strip to hold the sheet metal device in attached position thereon.

5. Fastening means for securing a member to a supporting part by a plurality of bolts, screws or other stud fasteners in spaced relation, comprising a retainer strip to be attached to said supporting part and provided with a longitudinal row of openings equi-distant from one longitudinal edge of the strip in regions of the strip spaced from the support, and stud securing means attached to said retainer strip over said openings therein and comprising identical sheet metal devices folded on themselves and each having spaced arms receiving said retainer strip therebetween with the folded edge substantially parallel with said longitudinal edge of the retainer strip, one of said arms being deformed to provide means for engaging a stud fastener passed through the associated opening in said retainer strip, and one of said arms having a projection on its inner face to engage the strip and retain said sheet metal device in bolt-receiving position.

6. A fastening device for attaching a member in a number of locations to a support having a row of holes through it comprising a comparatively thin strip having a row of bolt holes through it adapted to register with those of the support, the solid portions of the strip overlying solid portions of the support, means for attaching the strip to the support between bolt holes of the support in a manner to hold regions of the strip between the bolt holes thereof spaced from the support, and a set of thread-engaging elements, each having a snap fastening engagement with the strip and each comprising a strip of sheet metal doubled on itself to provide two arms adapted to lie on opposite sides of the strip respectively, each arm having an opening for the passage of a bolt, one of the arms being deformed about the opening therein to provide thread-engaging means, one of the arms having a projection adapted to occupy the opening in the strip, said projection having a face inclining toward the latter arm to enable the clip to slide readily across the strip and obtain a ratchet locking action therewith, the openings through the two arms being spaced from the fold of the clip a distance corresponding to the distance of the openings in the strip from the free edge of the strip whereby when the fold of the clip engages the free edge of the strip, the two openings in the arm will register with the hole in the strip.

7. Fastening means for securing a member to a supporting part by a plurality of bolts or screws in spaced relation, comprising a retainer strip having substantially flat portions provided with a series of openings defining bolt passages, apertures between said substantially flat portions and means at the apertures for holding the strip spaced from said supporting part, and nut devices attached to said retainer strip comprising doubled sheet members having spaced arms receiving said substantially flat portions of the retainer strip therebetween in attached relation with said nut, said arms having opening adapted to register with the openings in the retainer strip when the folded region of the nut device engages the edge of the retaining strip, one of said arms of each nut device carrying means for threadedly engaging a bolt or screw passed through the associated bolt retaining opening in the retainer strip.

GEORGE A. TINNERMAN.